INVENTOR.
PETER ZINKANN
BY Jacob L. Kolling
ATTORNEY

United States Patent Office 3,544,371
Patented Dec. 1, 1970

3,544,371
DEVICE FOR REGENERATING AN ION EXCHANGER, WATER SOFTENER IN A DISHWASHING OR OTHER WASHING MACHINE
Peter Zinkann, Gutersloh, Germany, assignor to Miele & Cie., Gutersloh, Germany
Filed Mar. 25, 1968, Ser. No. 715,758
Int. Cl. B08b *3/02, 13/00*
U.S. Cl. 134—93       1 Claim

ABSTRACT OF THE DISCLOSURE

An ion exchanger water softener is mounted exteriorly of the washing tub of a washing machine. A receiving holder for a salt container is provided in the bottom of the tub. A salt container having a strainer and an outlet provided with strainer openings is detachably mounted on the holder. A solenoid valve is provided in the water conduit to the strainer. The holder is connected to the inlet of the water softener. The outlet of the water softener is connected with the tub. A pump for scavenging the used water is provided. The solenoid valve is actuated for inlet of water during predetermined periods.

BACKGROUND OF THE INVENTION

Figures 1, 2:
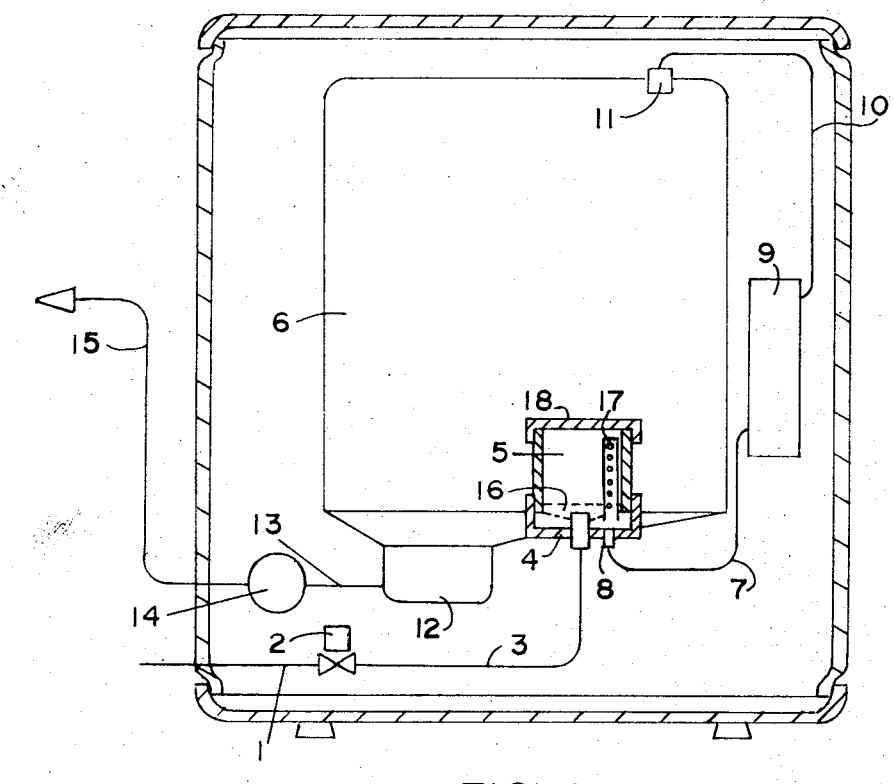

The invention relates to a means for regenerating an ion exchanger water softener in a clothes, dish or other washing machine.

It is generally known that water softeners of the ion exchanger type are constructed as large industrial installations, as installations for domestic water supply and as small appliances for direct installation in dishwashing machines or in washing machines.

In the larger installations the regeneration is effected by means of a reverse flow, salting and final rinsing, whereby the direction of the flow is changed in individual cycles. This regeneration requires, however, an extensive use of valves and control elements and is therefore not adaptable for small appliances.

Consequently, there have been introduced regeneration methods which obviate the reverse flow and carry out the salting as well as the final rinsing in the normal direction of the flow. The introduction of the salt brine is accomplished in different ways, for example, by arranging a pipe in a bucket with salt brine, which is placed at a certain height.

The salt brine flows slowly into the softener and remains there for some time, before it is discharged. This method, however, is time-consuming and complicated.

It is further known to add salt to a rigidly mounted vessel. A separate solenoid valve of small passage capacity is opened for salting the softener, while water is sent under pressure into the salt vessel and the brine from this vessel is sent under pressure into the softener. Finally, the scavenging is effected by means of the solenoid valve. The water which is scavenged reaches either the tub or the drain, directly through a control valve. The disadvantage of this construction is that, here again, an additional solenoid valve or the like, for the rinsing of the brine, is required.

It is further known to fill a stationary vessel with salt. In this case, however, it is necessary to provide a baffle in the salt vessel, which will retard the speed of the flow of the salt brine, so that an extensive contact time will be provided for the salt brine with the exchange resin.

These known devices possess, however, a special disadvantage, in that during a low speed of flow which is required for an extensive contact period, there are easily formed passages in the gummy filling and the regeneration is therefore incomplete. A higher flow speed is likewise accompanied by an incomplete regeneration, due to the short contact period.

The object of the invention is to provide a device for regenerating an ion exchanger water softener for washing and dishwashing machines in which the above disadvantages are overcome without requiring additional valves. Consequently, the invention is characterised by the feature that a salt container filled with salt and provided with a strainer and an outlet tube is provided in the tube circuit for the water supply between a solenoid valve and a water softener at the bottom of the tub, in such a manner that the salt brine is led under pressure with a higher speed of flow ino the softener by the periodic actuation of the solenoid valve, remaining there for a certain time and after leaving the tub, being forwarded to the tub by a washing pump.

A further feature of the invention resides in the provision of peripheral strainer openings of the outlet tube mounted in the salt container. In the drawing, showing an example of the invention, FIG. 1 is a dishwashing machine in cross-section with the described device mounted therein and FIG. 2 is a schematic representation of the programming of the regeneration.

According to FIG. 1, the water piping to the solenoid valve 2 is indicated by the numeral 1. A pipe conduit 3 is led from the solenoid valve 2 to a receiving part 4, for the salt container 5, in the tub 6 of a known dishwashing machine. A further pipe 7 is led from the outlet 8 of the receiving part 4 to the softener 9. A pipe 10 extends from said softener 9 to the inlet 11 of the tub 6. The rinsing pipe 13 is led, through a washing pump 14, from the collecting container 12 of the tub 6 to the drain 15.

The salt container 5 is provided in its interior with a strainer 16 and an outlet 17 provided with strainer openings. On its top, the salt container 5 is closed by a cap 18, in known manner. To regenerate, the salt container is placed on the receiving part 4 and is secured thereto by means of a bayonet lock or the like. The receiving part 4 is closed with a flat lid (not shown). In normal use, the raw water reaches the softener 9 through the solenoid valve 2 and the receiving part 4, closed with the cover. The softened water enters the tub 6 from this point at the inlet support 11.

To regenerate, the filled salt container 5 is placed on the receiving part 4. By opening the solenoid valve 2, the water finally reaches, with a high speed of flow, the salt container 5 and flows further, in the form of salt brine, to the softener 9. The water forced out of the softener 9 reaches the tub 6 and is pumped out by the pump 14.

In FIG. 2, there is shown a time schedule example, particularly of the switching on of the solenoid valve 2 and the pump 14. In this example, the switched on periods interchange from 30 seconds to pauses of 5 minutes during the salting. After four such changes the draining cycle takes place with a switched on time of 4 minutes.

The above periods are directed to normal passage capacities of the solenoid valve 2 and according to the amount of the softener 9. Thus, only so much salt brine should be forced into the softener 9, during a switched on period, as is required to fill said softener. During the following period the ionic exchange takes place.

The switched on period during the final rinsing is likewise dependent on the amount of flow and the quantity of softener. It is obviously possible to divide the final rinsing time into several intervals.

The salt container 5 is constructed to such dimensions that it is capable of receiving a quantity of dry salt which is required for a regeneration cycle.

The pump 14 is switched on during the same time periods as the solenoid valve 2, in order to pump out the amounts of water which are forced out of the softener 9. The switched on periods of the pump 14 may be varied, in a particular instance.

The entire control of the regeneration process is arranged automatically by a programming mechanism, which also controls the function of the normal use of the machine. In machines with several program selection possibilities, a separate program for the regeneration should be provided. The switched on periods for the regeneration cycle should be calculated in such a manner that the complete time thereof is within the normal running time of the program. The advantage of the invention resides in that only one salt retaining container is required. In addition the retaining capacity of the softener is substantially improved by the above described type of regeneration, as against the heretofore usual methods employed in small appliances. A further advantage is that it is additionally possible to install a suitable indicator in the cover of the retainer during normal use, said indicator being preset for a softening capacity and shifting when a capacity limit is reached.

What I claim is:

1. In a washing machine provided with a tub, a water softener mounted exteriorly of the tub, a receiving holder for a salt container, mounted in the bottom portion of said tub, a first conduit for connecting said receiving holder with a water supply source, a solenoid valve in said first conduit, a second conduit connecting said receiving holder with the inlet of the water softener, a third conduit connecting the outlet of the water softener with the interior of the tub, a salt container detachably mounted in said receiving holder, said salt container being provided with a strainer and an outlet member formed with a plurality of openings, a collecting container in the bottom portion of said tub and a pump for draining the water from said collecting container and programming means to periodically open said solenoid valve to permit the flow of water into said salt container and for closing said valve during said draining.

References Cited

UNITED STATES PATENTS

| | | | |
|---|---|---|---|
| 2,015,566 | 9/1935 | Lowry | 134—93 |
| 3,087,504 | 4/1963 | Geschka | 134—57 |
| 3,148,687 | 9/1964 | Dosch | 134—58 |
| 3,342,336 | 9/1967 | Rose | 68—13 XR |

FOREIGN PATENTS 962,507    7/1964    Great Britain.

ROBERT L. BLEUTGE, Primary Examiner

U.S. Cl. X.R.

68—13.1; 134—115; 210—167, 191